US012562971B2

(12) United States Patent
Ji et al.

(10) Patent No.: US 12,562,971 B2
(45) Date of Patent: Feb. 24, 2026

(54) DISTRIBUTED STORAGE SYSTEM, EXCEPTION HANDLING METHOD THEREOF, AND RELATED APPARATUS

(71) Applicant: Huawei Technologies Co., Ltd., Shenzhen (CN)

(72) Inventors: Zhigang Ji, Beijing (CN); Ning Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 250 days.

(21) Appl. No.: 18/064,752

(22) Filed: Dec. 12, 2022

(65) Prior Publication Data

US 2023/0106077 A1 Apr. 6, 2023

Related U.S. Application Data

(63) Continuation of application No. PCT/CN2021/095586, filed on May 24, 2021.

(30) Foreign Application Priority Data

Jun. 12, 2020 (CN) .......................... 202010538198.4

(51) Int. Cl.
| | |
|---|---|
| *G06F 11/00* | (2006.01) |
| *G06F 11/07* | (2006.01) |
| *G06F 11/32* | (2006.01) |
| *H04L 41/00* | (2022.01) |
| *H04L 43/0817* | (2022.01) |

(52) U.S. Cl.
CPC ........ *H04L 43/0817* (2013.01); *G06F 11/076* (2013.01); *G06F 11/0772* (2013.01); *G06F 11/0793* (2013.01); *G06F 11/328* (2013.01); *H04L 41/00* (2013.01)

(58) Field of Classification Search
CPC .. G06F 11/328; G06F 11/076; G06F 11/0772; G06F 11/0793; G06F 11/0709; G06F 11/0757; G06F 11/2089
USPC ....................................................... 714/1–57
See application file for complete search history.

(56) References Cited

U.S. PATENT DOCUMENTS

| | | | |
|---|---|---|---|
| 6,173,411 B1 * | 1/2001 | Hirst ...................... H04L 43/50 |
| | | | 714/4.3 |
| 10,275,326 B1 | 4/2019 | Stickle et al. |
| 10,592,328 B1 * | 3/2020 | Thompson .......... G06F 11/3072 |

(Continued)

FOREIGN PATENT DOCUMENTS

| | | |
|---|---|---|
| CN | 1756241 A | 4/2006 |
| CN | 106936662 A | 7/2017 |

(Continued)

*Primary Examiner* — Sarai E Butler
(74) *Attorney, Agent, or Firm* — Conley Rose, P.C.

(57) ABSTRACT

A distributed storage system includes a first access device and a plurality of nodes. The nodes include a first node and a second node, the first node accesses the first access device, and the first node is a storage node, a compute node, or a control node. The first access device is configured to detect a status of the first node and send a first notification message to the second node when the status meets a preset condition. The first notification message includes an identifier of the first node and status information of the first node. The second node is configured to receive the first notification message and perform a processing operation based on the first notification message.

24 Claims, 5 Drawing Sheets

(56)                  References Cited

U.S. PATENT DOCUMENTS

| | | | | | |
|---|---|---|---|---|---|
| 2003/0191992 A1* | 10/2003 | Kaminsky | ........... | G06F 11/0727 | 714/E11.025 |
| 2008/0151724 A1* | 6/2008 | Anderson | ........... | G06F 11/1471 | 369/53.42 |
| 2008/0294940 A1* | 11/2008 | Haga | .................... | G06F 11/2007 | 714/37 |
| 2009/0006890 A1* | 1/2009 | Takada | ................ | G06F 11/0724 | 714/5.11 |
| 2009/0213725 A1* | 8/2009 | Kibel | ...................... | H04L 12/66 | 370/216 |
| 2012/0324272 A1* | 12/2012 | Iwasawa | ............. | G06F 11/2033 | 714/E11.071 |
| 2013/0013956 A1* | 1/2013 | Armstrong | ........... | G06F 11/326 | 714/4.12 |
| 2013/0097465 A1* | 4/2013 | Eslambolchi | ........ | H04Q 3/0062 | 714/57 |
| 2013/0262937 A1* | 10/2013 | Sridharan | ........... | G06F 11/0709 | 370/242 |
| 2013/0332597 A1* | 12/2013 | Kumar | ................ | H04L 67/1008 | 709/224 |
| 2014/0149794 A1* | 5/2014 | Shetty | ................... | G06F 16/951 | 709/213 |
| 2014/0201577 A1* | 7/2014 | Ohtake | ............... | G06F 11/2041 | 714/48 |
| 2015/0082080 A1* | 3/2015 | Lin | ...................... | G06F 11/3041 | 714/48 |
| 2016/0170819 A1* | 6/2016 | Zhou | ..................... | G06F 11/008 | 714/54 |
| 2017/0091003 A1 | 3/2017 | Das Sharma et al. | | | |
| 2018/0101429 A1* | 4/2018 | Melanchenko | ..... | G06F 11/0772 | |
| 2018/0225168 A1* | 8/2018 | Kona | .................. | G06F 11/0772 | |
| 2018/0309835 A1 | 10/2018 | Zhi et al. | | | |
| 2019/0215313 A1* | 7/2019 | Doshi | ..................... | G06F 3/065 | |
| 2020/0145283 A1 | 5/2020 | Zeng et al. | | | |

FOREIGN PATENT DOCUMENTS

| | | |
|---|---|---|
| CN | 107924343 A | 4/2018 |
| CN | 109088794 A | 12/2018 |
| CN | 109257195 A | 1/2019 |
| CN | 110535692 A | 12/2019 |
| CN | 110740072 A | 1/2020 |
| CN | 110830283 A | 2/2020 |
| WO | 2013143065 A1 | 10/2013 |
| WO | 2019011018 A1 | 1/2019 |

* cited by examiner

| Local node | Type | Description | Attribute | Subscription node | Node type | Description | Attribute |
|---|---|---|---|---|---|---|---|
| 50a | Compute node | Computation function A | Active | 40a | Storage node | Data B | Active |
| 50a | Compute node | Computation function A | Active | 50d | Compute node | Computation function A | Standby |
| 50a | Compute node | Computation function A | Active | 60a | Control node | Control function | Active |
| 40a | Storage node | Data B | Active | 40b | Storage node | Data B | Standby |
| 40a | Storage node | Data B | Active | 60a | Control node | Control function | Active |
| 40a | Storage node | Data B | Active | 50a | Compute node | Computation function A | Active |
| 40b | Storage node | Data C | Standby | 40g | Storage node | Data C | Active |
| ... | ... | ... | ... | ... | ... | ... | ... |

FIG. 4

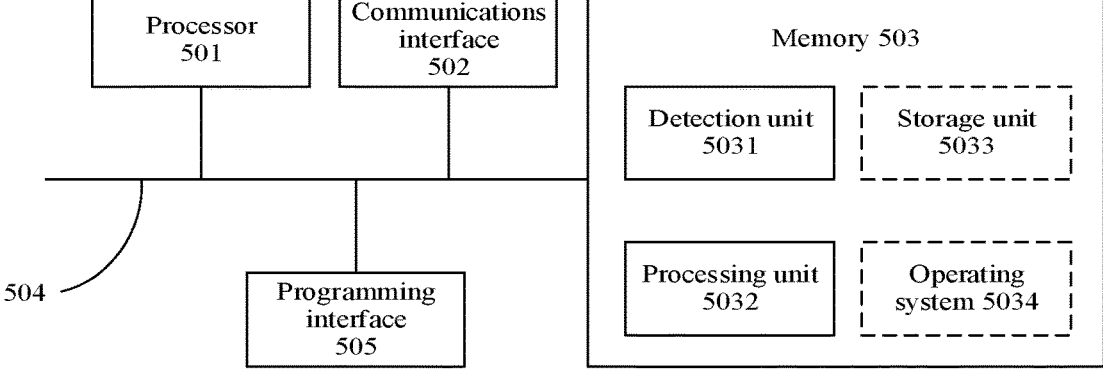

FIG. 5

DISTRIBUTED STORAGE SYSTEM, EXCEPTION HANDLING METHOD THEREOF, AND RELATED APPARATUS

CROSS-REFERENCE TO RELATED APPLICATIONS

This application is a continuation of International Patent Application No. PCT/CN2021/095586 filed on May 24, 2021, which claims priority to Chinese Patent Application No. 202010538198.4 filed on Jun. 12, 2020. The disclosures of the aforementioned applications are hereby incorporated by reference in their entireties.

TECHNICAL FIELD

This disclosure relates to the field of storage technologies, and in particular, to a distributed storage system, an exception handling method applied to the distributed storage system, and a related apparatus.

BACKGROUND

Distributed storage is a data storage technology used to store data on storage nodes at different locations in a distributed manner. These storage nodes at different locations are interconnected by using a network device, to transmit data and exchange information. A node that accesses and uses data in a storage node is referred to as a compute node. The storage node, the network device, and the compute node form a distributed storage system. The distributed storage system may further include a control node, to manage the storage node and the compute node.

The distributed storage system has a high requirement on reliability of the distributed storage system. Exception events such as congestion, a link fault, and a packet loss affect reliability of the distributed storage system. How to enable a node to quickly discover and handle an exception in the distributed storage system becomes a problem that needs to be resolved in the art.

SUMMARY

This disclosure provides a distributed storage system, an exception handling method applied to the distributed storage system, and a related apparatus, so that a node in the distributed storage system can quickly discover and handle a network exception, to improve exception detection efficiency of the distributed storage system, and further improve reliability of the distributed storage system.

A first aspect of this disclosure provides a distributed storage system. The distributed storage system includes a first switch and a plurality of nodes, the plurality of nodes includes a first node and a second node, the first node accesses the first switch, and the first node is a storage node, a compute node, or a control node. The first switch is configured to detect a status of the first node, and send a first notification message to the second node when the status of the first node meets a preset condition, where the first notification message includes an identifier of the first node and status information of the first node. The second node is configured to receive the first notification message, and perform a processing operation based on the first notification message. The first node and the second node are distinguished based on functions. There may be one or more first nodes, and there may be one or more second nodes.

In this disclosure, the first switch detects the status of the node connected to the first switch, and sends the status of the first node to the second node by using the first notification message when the status of the first node meets the preset condition, so that the first node and the second node can be prevented from sending a keepalive message to each other, to reduce a quantity of keepalive messages in a network, save network bandwidth, reduce time consumed to learn of the status of the first node by the second node, and improve reliability of the distributed storage system.

Optionally, that the status of the first node meets the preset condition includes that a value of a running parameter of the first node is greater than or equal to a specified threshold, and the status information of the first node includes the value of the running parameter of the first node, or that the status of the first node meets the preset condition includes that the first node is locally unreachable, and the status information of the first node includes an identifier indicating that the first node is locally unreachable.

In this disclosure, the first switch not only detects whether the first node is locally unreachable, but also may detect the running parameter of the first node. In this way, the first switch may send different states of the first node to the second node based on a requirement of the second node, so that the second node performs processing in a timelier manner, to reduce impact caused by a state change of the first node, and avoid service interruption.

Optionally, that the first node is locally unreachable includes that the first switch does not receive a keepalive message from the first node within specified time, or a port through which the first switch is connected to the first node fails.

In this disclosure, the first switch may comprehensively detect the status of the first node in a plurality of manners, to ensure that the detected status of the first node is timely and accurate, to improve reliability of the distributed storage system.

Optionally, when sending the first notification message to the second node, the first switch is configured to send the first notification message to the second node based on a query message sent by the second node, or actively send the first notification message to the second node based on a specified condition. The second node may be a node that subscribes to the status information of the first node, or all nodes in a network.

In this disclosure, the first switch sends the first notification message to the second node in a plurality of manners, to improve flexibility of the distributed storage system.

Optionally, the distributed storage system further includes a second switch and a third node connected to the second switch. The first switch is further configured to send a second notification message to a fourth node when routing information of the third node is deleted or set to invalid, where the fourth node accesses the first switch, and the second notification message is used to notify the fourth node that the third node is remotely unreachable.

In this disclosure, the first switch further detects whether the third node connected to the second switch is reachable, and sends the notification message to the fourth node of the first switch when the third node is unreachable, so that the fourth node performs corresponding processing, to prevent the fourth node from communicating with the third node when the third node is unreachable, so as to improve reliability of the distributed storage system.

Optionally, the distributed storage system further includes a second switch, and the first switch is further configured to send a second notification message to a fourth node after communication with the second switch is interrupted, where the fourth node accesses the first switch, and the second notification message is used to notify the fourth node that communication with the second switch is interrupted or all third nodes connected to the second switch are remotely unreachable.

In this disclosure, the second switch further detects whether communication with the second switch is interrupted, and sends the second notification message to the fourth node when communication between the first switch and the second switch is interrupted, so that when communication between the first switch and the second switch is interrupted, the fourth node is prevented from communicating with the third node connected to the second switch, to improve reliability of the distributed storage system.

A second aspect of this disclosure provides an exception handling method, and the method is performed by the first switch in the distributed storage system in the first aspect. The first switch detects a status of a first node, where the first switch is a switch of the first node, and the first node is a storage node, a compute node, or a control node. The first switch sends a first notification message to a second node when the status of the first node meets a preset condition, where the second node is a node other than the first node in the distributed storage system, and the first notification message includes an identifier of the first node and status information of the first node.

Optionally, that the status of the first node meets the preset condition includes that a value of a running parameter of the first node is greater than or equal to a specified threshold, and the status information of the first node includes the value of the running parameter of the first node, or that the status of the first node meets the preset condition includes that the first node is locally unreachable, and the status information of the first node includes an identifier indicating that the first node is locally unreachable.

Optionally, that the first node is locally unreachable includes that the first switch does not receive a keepalive message from the first node within specified time, or a port through which the first switch is connected to the first node fails. Optionally, sending a first notification message to a second node includes that the first switch sends the first notification message to the second node based on a query message sent by the second node. Alternatively, the first switch actively sends the first notification message to the second node based on a specified condition.

Optionally, the distributed storage system further includes a second switch and a third node connected to the second switch. The first switch sends a second notification message to a fourth node when routing information of the third node is deleted or set to invalid, where the fourth node accesses the first switch, and the second notification message is used to notify the fourth node that the third node is remotely unreachable.

Optionally, the distributed storage system further includes a second switch, and the first switch sends a second notification message to a fourth node after communication between the first switch and the second switch is interrupted, where the fourth node accesses the first switch, and the second notification message is used to notify the fourth node that a third node connected to the second switch is remotely unreachable.

A third aspect of this disclosure provides an exception handling method, where the method is applied to the second node of the distributed storage system, the distributed storage system includes a first node, the first node accesses a first switch, and the first node is a storage node, a compute node, or a control node. The second node receives a first notification message from the first switch, where the first notification message is generated when the first switch determines that a status of the first node meets a preset condition, and the first notification message includes an identifier of the first node and status information of the first node. The second node performs a processing operation based on the first notification message.

Optionally, the status information of the first node includes an identifier indicating that the first node is locally unreachable, and that the second node performs a processing operation based on the first notification message includes that the second node obtains the identifier of the first node from the first notification message. The second node determines, based on the status information of the first node, that the first node is locally unreachable. The second node determines a type and an attribute of the first node based on the identifier of the first node. The second node performs a fault handling operation based on the type and the attribute of the first node and a type and an attribute of the second node.

Optionally, the status information of the first node includes a value of a running parameter of the first node, and that the second node performs a processing operation based on the first notification message includes that the second node obtains the identifier of the first node and the value of the running parameter of the first node from the first notification message, the second node sends an alarm message when the value of the running parameter is greater than or equal to an alarm threshold of the running parameter and less than a fault threshold of the running parameter, where the alarm message includes the identifier of the first node and the value of the running parameter of the first node, or the second node determines a type and an attribute of the first node based on the identifier of the first node when the value of the running parameter is greater than a fault threshold of the running parameter, and the second node performs a fault handling operation based on the type and the attribute of the first node and a type and an attribute of the second node.

Optionally, the distributed storage system further includes a second switch. The second node further receives a second notification message, where the second notification message is used to notify the second node that communication with the second switch is interrupted or all third nodes connected to the second switch are remotely unreachable. The second node performs a processing operation based on the second notification message.

Optionally, the second notification message includes an identifier of the third node and an identifier indicating that the third node is remotely unreachable, and that the second node performs a processing operation based on the second notification message includes that the second node obtains the identifier of the third node from the second notification message. The second node determines, based on status information of the third node, that the first node is remotely unreachable. The second node determines a type and an attribute of the third node based on the identifier of the third node. The second node performs a fault handling operation based on the type and the attribute of the third node and the type and the attribute of the second node.

In this disclosure, the second node may directly determine the unreachable third node based on the identifier of the third node in the second notification message, and avoid communicating with the third node, so that reliability of the distributed storage system can be improved.

Optionally, the second notification message includes an identifier or a subnet prefix of the second switch, and that the second node performs a processing operation based on the second notification message includes that the second node obtains the identifier or the subnet prefix of the second switch from the second notification message. The second node determines an identifier that is of the third node and that matches the identifier or the subnet prefix of the second switch. The second node determines a type and an attribute of the third node based on the identifier of the third node. The second node performs a fault handling operation based on the type and the attribute of the third node and the type and the attribute of the second node.

In this disclosure, the first switch only needs to send a second notification message including the identifier or the subnet prefix of the second switch to the second node, and the second node can perform an operation, to avoid communicating with all third nodes of the second switch, so as to improve processing efficiency, save network bandwidth, and improve network reliability.

Optionally, the second notification message includes an identifier or a subnet prefix of the second switch, and that the second node performs a processing operation based on the second notification message includes that the second node obtains the identifier or the subnet prefix of the second switch from the second notification message. The second node stores the identifier or the subnet prefix of the second switch. The second node compares an identifier of a new node with the identifier or the subnet prefix of the second switch before the second node needs to access the new node. The second node determines a type and an attribute of the new node based on the identifier of the new node when the identifier of the new node matches the identifier or the subnet prefix of the second switch. The second node performs a fault handling operation based on the type and the attribute of the new node and the type and the attribute of the second node.

In this implementation, the second node does not need to perform corresponding processing when receiving the identifier or the subnet prefix of the second switch, but needs to determine, only when accessing the new node, whether the new node is a third node that needs to avoid communication, to improve implementation flexibility, and save processing resources of the second node.

A fourth aspect of this disclosure provides a switch. The switch includes functional modules that perform the exception handling method according to any one of the second aspect or the possible designs of the second aspect. Division into the functional modules is not limited in this disclosure. The functional modules may be correspondingly obtained through division based on procedure steps of the exception handling method in the first aspect, or the functional modules may be obtained through division based on a specific implementation requirement.

A fifth aspect of this disclosure provides a node. The node includes functional modules that perform the exception handling method according to any one of the third aspect or the possible designs of the third aspect. Division into the functional modules is not limited in this disclosure. The functional modules may be correspondingly obtained through division based on procedure steps of the exception handling method in the third aspect, or the functional modules may be obtained through division based on a specific implementation requirement.

A sixth aspect of this disclosure provides a host. A node runs on the host, and the host includes a memory, a processor, and a communications interface. The memory is configured to store computer program code and data, and the processor is configured to invoke the computer program code, so that the node implements, based on the data, the exception handling method according to any one of the third aspect or the possible designs of the third aspect of this disclosure.

A seventh aspect of this disclosure provides a chip. When the chip runs, the chip can implement the exception handling method according to any one of the second aspect or the possible designs of the second aspect of this disclosure, and implement the exception handling method according to any one of the third aspect or the possible designs of the third aspect of this disclosure.

An eighth aspect of this disclosure provides a storage medium. The storage medium stores program code, and when the program code runs, a device (a switch, a server, a terminal device, or the like) that runs the program code is enabled to implement the exception handling method according to any one of the second aspect or the possible designs of the second aspect of this disclosure, and implement the exception handling method according to any one of the third aspect or the possible designs of the third aspect of this disclosure.

For beneficial effects of the second aspect to the eighth aspect of this disclosure, refer to descriptions of beneficial effects of the first aspect and the possible designs of the first aspect. Details are not described herein again.

BRIEF DESCRIPTION OF DRAWINGS

FIG. 4 is a schematic diagram of a subscription table according to an embodiment of this disclosure;

FIG. 5 is a schematic diagram of a structure of an access device 500 according to an embodiment of this disclosure.

DESCRIPTION OF EMBODIMENTS

In embodiments of this disclosure, the word such as "example" or "for example" is used to represent giving an example, an illustration, or a description. Any embodiment or design scheme described as an "example" or "for example" in embodiments of this disclosure should not be explained as being more preferred or having more advantages than another embodiment or design scheme. Exactly, use of the word such as "example", "for example" is intended to present a relative concept in a specific manner.

In embodiments of this disclosure, unless otherwise stated, "a plurality of" means two or more. For example, a plurality of nodes means two or more nodes. "At least one" means any quantity, for example, one, two, or more than two. "A and/or B" may represent that only A exists, only B exists, or both A and B are included. "At least one of A, B, and C" may represent that only A exists, only B exists, only C exists, A and B are included, B and C are included, A and C are included, or A, B, and C are included. In this disclosure, terms such as "first" and "second" are merely used for distinguishing between different objects, but are not used to indicate priorities or importance of the objects.

Embodiments of this disclosure are used to enable a node in a distributed storage system to quickly sense and process an exception in the distributed storage system. The exception includes a network running exception such as congestion, a packet loss, excessively high central processing unit (CPU) usage, and an excessively long delay, and a network fault such as a port failure and service interruption. To make objectives, technical solutions, and advantages of this disclosure clearer, the following further describes this disclosure in detail with reference to accompanying drawings.

Figure 1:
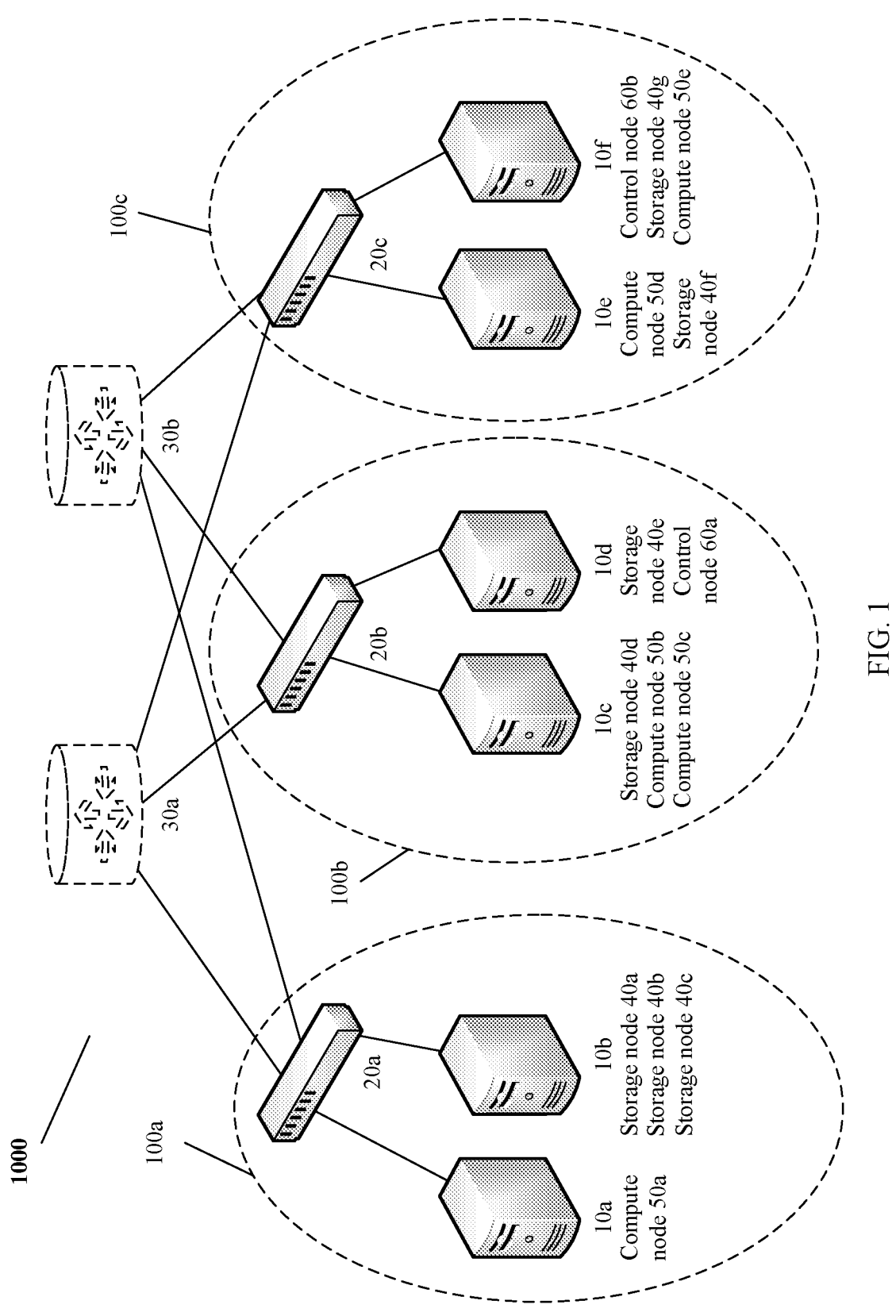
FIG. 1 is a schematic diagram of a structure of a distributed storage system according to an embodiment of this disclosure.

FIG. 1 is a schematic diagram of a structure of a distributed storage system according to an embodiment of this disclosure. The distributed storage system in this disclosure includes an access device 20, a compute node 50, and a storage node 40. The storage node 40 and the compute node 50 may be distributed on one or more hosts 10. A plurality of distributed storage systems can form a larger system. For example, a distributed storage system 100*a* includes a compute node 50*a* deployed on a host 10*a*, storage nodes 40*a* to 40*c* deployed on a host 10*b*, and an access device 20*a* connected to the hosts 10*a* and 10*b*. The distributed storage system may further include a control node 60, to manage the storage node 40 and the compute node 50. For example, in addition to compute nodes and storage nodes that are deployed on hosts 10*c* and 10*d*, and an access device 20*b*, a distributed storage system 100*b* further includes a control node 60*a* deployed on the host 10*d*. The distributed storage system 100*a*, the distributed storage system 100*b*, and a distributed storage system 100*c* are communicatively connected by using backbone devices 30*a* and 30*b*, to form a larger distributed storage system 1000.

In the distributed storage system in this disclosure, the storage node 40, the compute node 50, and the control node 60 may be collectively referred to as nodes, the host 10 is a carrier of the nodes, and one host may carry one or more nodes. A plurality of nodes that can be carried by one host may include one or more of the compute node 50, the storage node 40, or the control node 60. The host 10 may be a device that can carry a node, such as a physical server, a virtual server, a workstation, a mobile station, or a general-purpose computer. The storage node 50 is configured to store data. The data may be any digitalized information, for example, information generated when a user uses a network application, a file stored by the user, or a network configuration. The compute node 50 is configured to obtain data from the storage node 40, and perform service processing based on the obtained data. The access device 20 is configured to connect to different hosts, and forward data sent between nodes on the hosts. The backbone device 30 is configured to connect to different access devices, to expand a scale of the distributed storage system. The access device 20 may be a layer-2 switch or a layer-3 switch, and the backbone device 30 may be a layer-3 switch or a router. To improve system reliability, a standby node may be deployed for one node. For example, the compute node 50*a* and a compute node 50*b* may both provide a computation function A, and the compute node 50*a* may be used as an active compute node of the computation function A, and the compute node 50*b* may be used as a standby compute node of the computation function A. For another example, if the storage node 40*a* and a storage node 40*g* both store data B, the compute node 40*a* may be used as an active storage node of the data B, and the compute node 40*g* may be used as a standby storage node of the data B. For another example, the control node 60*a* is an active control node, and a control node 60*b* is a standby control node. The distributed storage system may not include the control node. When the distributed storage system does not include the control node, a network management system may manage the storage node 40 and the compute node 50.

Figure 2:
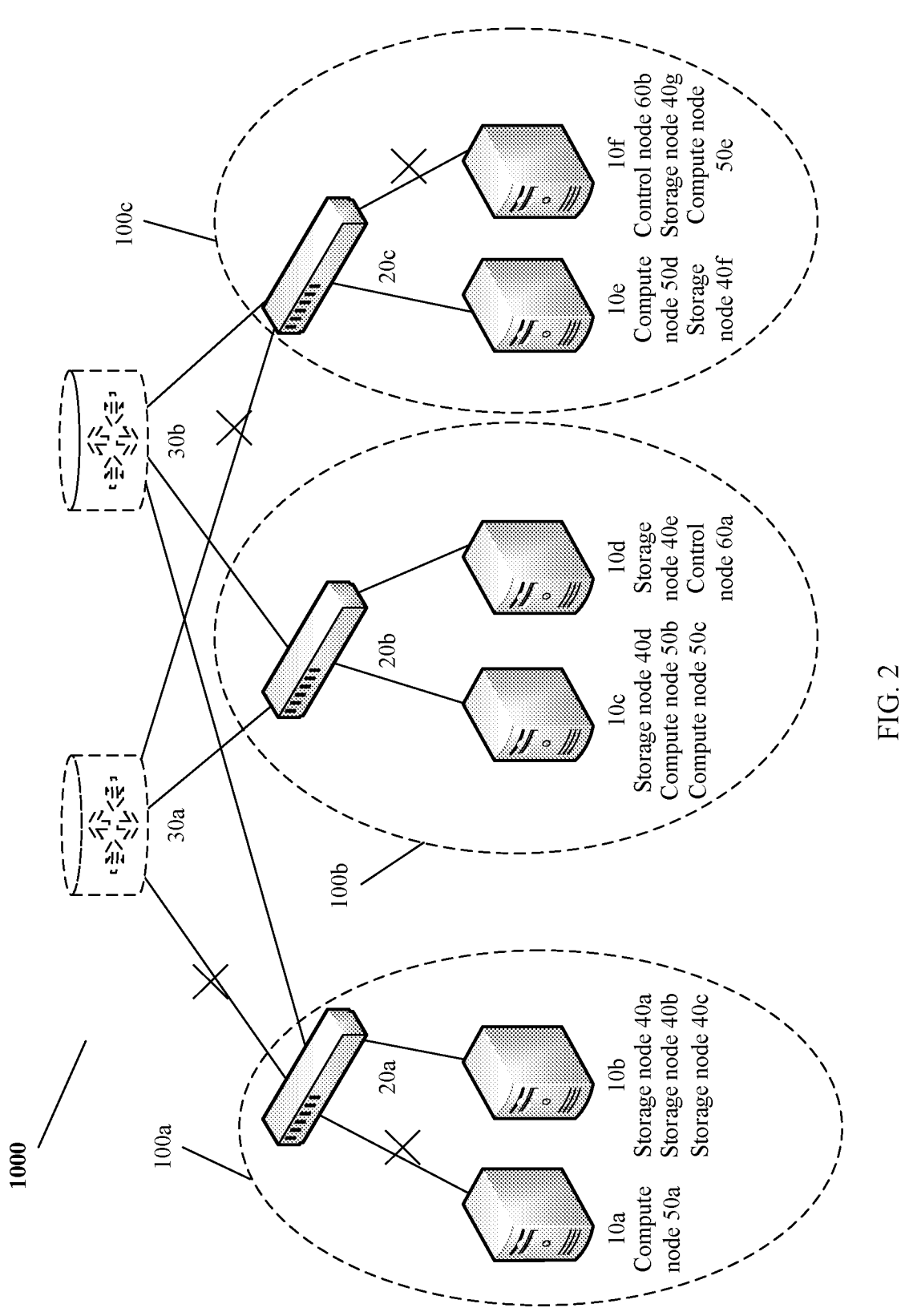
FIG. 2 is a schematic diagram of a fault location of a distributed storage system according to an embodiment of this disclosure.

A fault may occur in a running process of the distributed storage system. A process in which the compute node 50*a* reads data from the storage node 40*g* is used as an example. A location (represented by X) at which a fault may occur in the distributed storage system shown in FIG. 1 is shown in FIG. 2. That is, a fault may occur between any two devices, and the fault may be a port fault of a device in the two devices, or may be a link fault. Generally, the nodes in the distributed storage system detect the fault by sending keepalive packets to each other, to avoid sending a request to a disconnected node. However, it can be learned from FIG. 2 that a path between two nodes may be very long, and a manner of detecting the fault by sending the keepalive packets between the nodes causes a large quantity of keepalive packets to exist in a network, which wastes network and system resources. In addition, a long heartbeat waiting time is usually set, to prevent a case in which heartbeat packets cannot be replied in time because the host is busy or the like. This results in a long fault convergence time and further causes service interruption. Further, in a running process of any node or device in the distributed storage system, an event that affects network performance, such as a packet loss, an increase in a delay, excessively high CPU utilization, or an increase in a bit error rate, may occur. If a related node cannot be notified of these events in time, the related node still communicates with a node affected by the exception. This causes a service delay or service interruption. In this disclosure, a network fault and an event that affects the network performance are collectively referred to as an exception.

Figure 3:
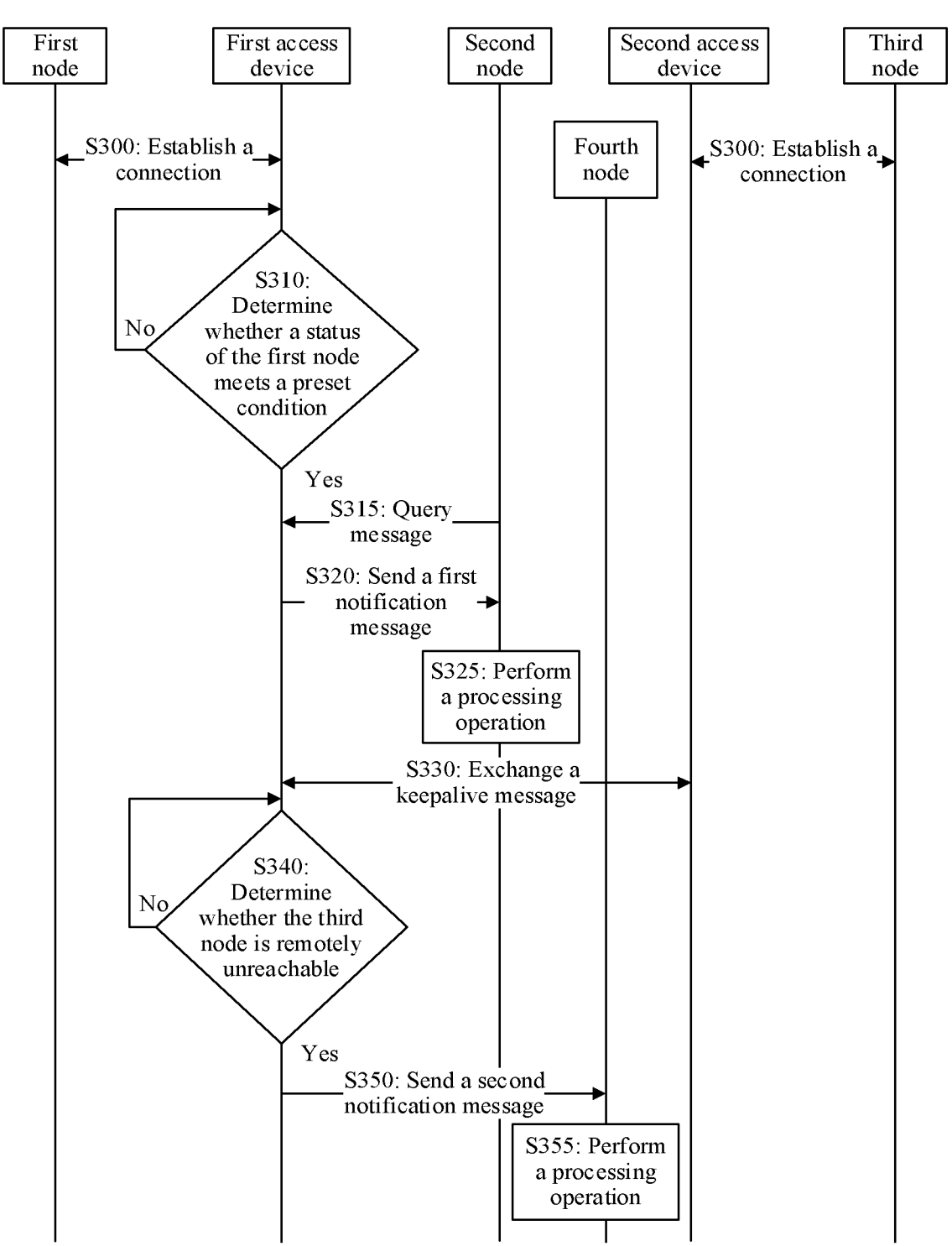
FIG. 3 is a schematic flowchart of an exception handling method according to an embodiment of this disclosure.

To avoid network performance deterioration or service interruption caused by a network exception, based on the distributed storage system shown in FIG. 1, an embodiment of this disclosure provides an exception handling method in which an access device of a node performs exception detection, to improve efficiency of exception discovery and exception handling in the distributed storage system and save network resources. In the following embodiments, for ease of description, the distributed storage system shown in FIG. 1 is abstracted as including a first access device and a plurality of nodes. The plurality of nodes includes a first-type node and a second-type node, and the first-type node accesses the access device (that is, the first access device is an access device of the first-type node). Further, the distributed storage system further includes a second access device, a third-type node, and a fourth-type node. The third-type node accesses the second access device, and the fourth-type node accesses the first access device. The first-type node, the second-type node, the third-type node, and the fourth-type node in this disclosure are distinguished based on functions, and are not specific nodes. For example, a first-type node in a scenario may be a second-type node in another scenario. Any type of node may include one or more nodes. For ease of description in this disclosure, the first-type node, the second-type node, the third-type node, and the fourth-type node are respectively referred to as a first node, a second node, a third node, and a fourth node. The following describes functions of the first access device, the second access device, backbone devices, and each node with reference to FIG. 3. As shown in FIG. 3, the exception handling method provided in this embodiment of this disclosure includes steps S300-S355. Steps S300-S355 may be deleted based on a scenario requirement. That is, the fault implementation method provided in this embodiment of this disclosure does not require that all processes in steps S300-S355 be performed.

In step S300, a connection between a node and a corresponding access device is established. When accessing a network, each node needs to establish a connection to a corresponding access device. In FIG. 3, an example in which the first node is connected to the first access device and the third node is connected to the second access device is used for description. The first node may be a storage node, a compute node, or a control node. The second node may be a storage node, a compute node, or a control node that subscribes to status information of the first node, or may be any node other than the first node. Description is subsequently provided with reference to a specific scenario. The first access device may be any one of the access devices 20a, 20b, and 20c in FIG. 1, and the second access device is any access device other than the first access device.

In step S310, the first access device determines whether a status of the first node meets a preset condition. When the status of the first node does not meet the preset condition, the first access device may continue to perform step S310 after waiting for a period of time, or the first access device may immediately continue to perform step S310. When the status of the first node meets the preset condition, the first access device performs step S320.

The preset condition may be that a value of a running parameter of the first node is greater than or equal to a specified threshold or that the first node is locally unreachable. When the status of the first node meets the preset condition, it may be considered that the first node is an abnormal node.

When the first access device continuously communicates with the first node, the first access device may obtain the running parameter of the first node. The running parameter of the first node may include, for example, one or more of a packet loss rate, a delay, a bit error rate, CPU utilization, and a network adapter status. The value of the running parameter indicates a running status of the first node, for example, normal running (the value of the running parameter is less than the specified threshold), or abnormal running (the value of the running parameter is greater than or equal to the specified threshold). The first access device may monitor or collect the value of the running parameter of the first node, determine whether the value of the running parameter of the first node is greater than or equal to the specified threshold, and send a first notification message to the second node when the value of the running parameter of the first node is greater than or equal to the specified threshold.

When communication between the first access device and the first node is interrupted, or when a route that reaches the first node and that is stored in the first access device is invalid, the first access device determines that a fault that makes the first node locally unreachable exists. In this disclosure, that a node is "locally unreachable" means that data cannot be forwarded to the node by using an access device of the node. For example, if a link between the compute node 50a and the access device 20a is faulty, and as a result, another node cannot send a message to the compute node 50a by using the access device 20a, the compute node 50a is locally unreachable relative to the access device 20a. That the communication between the first access device and the first node is interrupted may be, for example, that a port through which the first access device is connected to the first node is invalid, or the first access device does not receive a keepalive message from the first node within specified time (for example, every 5 minutes, every N specified keepalive message periods, or a specified time point). That the port through which the first access device is connected to the first node is invalid means that the port used by the first access device to connect to the first node is in a faulty (for example, down) state. A plurality of cases may cause the port through which the first access device is connected to the first node to be invalid. For example, the port through which the first access device is connected to the first node is faulty, a port through which the first node is connected to the first access device is faulty, a cable between the first access device and the first node is faulty, the first node is powered off, the first node is reset, an optical module of the first access device is faulty, or the like.

In step S320, the first access device sends the first notification message to the second node, where the first notification message includes an identifier of the first node and the status information of the first node.

In this disclosure, the first notification message is a type of message sent by the first access device when the first access device finds that the status of the first node accessing the first access device meets the preset condition, and there may be one or more first notification messages. The first notification message may include an identifier of the first node. In an implementation, the status information of the first node includes an identifier indicating that the first node is locally unreachable, and the identifier may be further a field or a marker bit. The first notification message may further include a fault location, fault time, and the like. The fault location in the first notification message may be further the identifier of the first node or an identifier of a port connected to the first node. The identifier of the first node may be information that can uniquely identify the node, such as an Internet Protocol (IP) address, a media access control (MAC) address, a device name, or a device identifier (ID) of the first node. When the first notification message is a running parameter notification message, the first notification message further includes a running parameter and a value of the running parameter.

In an implementation, step S320 may be that the first access device actively sends the first notification message to the second node based on a specified condition. The second node may be a node that subscribes to exception information of the first node, or may be a node determined by the first access device based on a specific rule. The rule may be determined based on a type of a node. For example, the rule may be that when an abnormal node is an active compute node, a notification message is sent to all standby compute nodes of the active compute node. Alternatively, the second node may be all other nodes except the first node.

In a scenario in which the second node is a node that subscribes to exception information of the first node, the first access device (for example, the access device 20a) may store a subscription table shown in FIG. 4. The subscription table records information about each node connected to the access device 20a and information about nodes to which each node subscribes. The subscription table is merely an example, and content in the subscription table may be deleted or added based on a requirement. The first access device may actively send the first notification message to the second node based on the subscription table. For example, if the compute node 50a subscribes to information about the storage node 40a, after detecting that the storage node 40a is locally unreachable or a value of a running parameter of the storage node 40a meets a preset condition, the access device 20a sends the first notification message to the compute node 50a.

In another implementation, step S320 may be that the first access device receives a query message sent by the second node, and sends the first notification message to the second node based on the query message. In this scenario, before step S320, S315 is further included, that is, the second node sends the query message to the first access device. The query message is used to obtain the status information of the first node from the first access device.

Optionally, the second node stores information about a target node (for example, a first node) of the second node and information about an access device (for example, a first access device) of the target node, and the second node may send a query message to the access device of the target node based on a requirement or based on a specified condition. The query message includes an identifier of the target node, and is used to obtain status information of the target node from the access device of the target node.

In step S325, the second node performs a processing operation based on the first notification message.

In an implementation, the second node obtains the status information of the first node based on the first notification message, and performs the processing operation based on the status information of the first node. As described above, the status information of the first node includes the value of the running parameter of the first node, or the identifier indicating that the first node is locally unreachable.

In an optional implementation, when the status information of the first node includes the identifier indicating that the first node is locally unreachable, the second node obtains the identifier of the first node, determines, based on the status information of the first node, that the first node is locally unreachable, determines a type and an attribute of the first node based on the identifier of the first node, and then performs a fault handling operation based on the type and the attribute of the first node and a type and an attribute of the second node. Because the first node is locally unreachable, the second node may consider that a fault occurs in a network. Therefore, the fault handling operation needs to be performed.

In this embodiment of this disclosure, a type of a node indicates whether the node is a control node, a compute node, or a storage node, and an attribute of the node indicates that the node is an active node or a standby node.

For example, the first notification message may include the identifier of the first node. The second node may search a node mapping table based on the identifier of the first node, determine the type and the attribute of the first node, and then perform the processing operation based on the type and the attribute of the first node and the type and the attribute of the second node. Optionally, the second node stores the node mapping table, and each entry of the node mapping table includes a correspondence among a node identifier, a node type, and a node attribute. The identifier of a node may be information that can uniquely identify the node, such as an IP address, a MAC address, a device name of the node, or a device identifier.

When the first node is the compute node, step S325 is implemented in the following possible manners.

(1) If the first node is an active compute node (for example, the compute node 50*a*) of a computation function A (in this disclosure, the computation function A is used to indicate any computation function), and the second node is a standby compute node (for example, the compute node 50*b*) of the computation function A, the second node switches the attribute of the second node to the active compute node of the computation function A.

(2) If the first node is an active compute node (for example, the compute node 50*a*) of a computation function A, and the second node is a control node (for example, the control node 60*a*), the control node modify an attribute of a standby compute node (for example, the compute node 50*b*) of the computation function A from standby to active based on the first notification message, and notifies the standby compute node, so that the standby compute node performs an active-standby switch (that is, enable the standby compute node to modify the attribute of the standby compute node from standby to active).

(3) If the first node is a standby compute node (for example, the compute node 50*b*) of a computation function A, and the second node is a control node (for example, the control node 60*a*), the control node updates a network topology (modifying an attribute of the standby compute node to be unavailable or deleting the standby compute node) based on the first notification message.

The foregoing implementation (1) usually occurs in a scenario in which no control node exists, and the implementation (2) usually occurs in a scenario in which a control node exists. Certainly, (1) and (2) may also be performed in a scenario in which a control node exists, and in such a case, the standby compute node of the computation function A may be switched to the active compute node of the computation function A based on the first notification message sent by the first access device, or may be switched to the active compute node of the computation function A based on a notification of the control node. Preferably, the switch operation is performed based on a message that is first to be received.

When the first node is the standby compute node of the computation function A, the first access device may neither send a notification message to the active compute node of the computation function A nor send a notification message to a storage node that stores data B that needs to be accessed by the computation function A, to avoid excessive messages in the distributed storage system.

When the first node is the storage node, step S325 is implemented in the following possible manners.

(4) If the first node is an active storage node (for example, the storage node 40*a*) of data B, and the second node is an active compute node (for example, the compute node 50*a*) of a computation function A that accesses the data B, the second node switches a read/write interface of the second node to a standby storage node (for example, the storage node 40*f*) of the data B, to obtain the data B from the standby storage node. Each compute node stores a storage node corresponding to each compute function and an attribute of each storage node. One compute function may correspond to a plurality of storage nodes. The attribute of the storage node includes active or standby.

(5) If the first node is an active storage node (for example, the storage node 40*a*) of data B, and the second node is a control node (for example, the control node 60*a*), the control node determines a new active storage node (for example, the storage node 40*g*) based on the first notification message, deletes the active storage node of the data B or modifies an attribute of the active storage node, determine the new active storage node for the data B, and notify an active compute node and a standby compute node of a computation function A that use the data B of information about the new active storage node.

(6) If the first node is a standby storage node (for example, the storage node 40*f*) of data B, and the second node is a control node (for example, the control node 60*a*), the control node deletes the standby storage node or modifies an attribute of the standby storage node to be unavailable based on the first notification message. Then, the control node selects a new standby storage node (for example, the storage node 40e) for the data B, and notifies an active storage node of the new standby storage node, so that the active storage node sends the data B to the new standby storage node.

(7) If the first node is a standby storage node (for example, the storage node 40f) of data B, and the second node is an active storage node (for example, the storage node 40a) of the data B, the active storage node stops sending the data B to the storage node.

In implementation, to avoid excessive data packets in the distributed storage system, when the active storage node is faulty, an access device of the active storage node may not send the first notification message to a standby compute node of a computation function that needs to access data stored on the active storage node. When the standby storage node is faulty, an access device of the standby storage node may not send the first notification message to a compute node (regardless of an active compute node or a standby compute node) of a computation function that needs to access data stored on the standby storage node.

When the first node is the control node, step S325 is implemented in the following possible manners.

(8) If the first node is an active control node, and the second node is a compute node or a storage node managed by the active control node, the second node stops sending information to the active control node based on the first notification message, and the second node registers with the new active control node after receiving a message sent by a new active control node.

(9) If the first node is an active control node, and the second node is a standby control node of the active control node, the second node switches the second node to the active control node after receiving the first notification message, and then sends a notification message to nodes (including compute nodes and storage nodes) managed by the second node, so that the managed nodes register with the second node.

When the first node is the standby control node, the first access device may not send a notification message to the compute node or the storage node, but only send a notification message to a management device or an administrator, so that the management device or the administrator specifies or deploys the standby control node again.

The distributed storage system shown in FIG. 1 may not include the control node. When the control node is not included, the foregoing processes related to the control node may not be performed.

In another optional implementation, when the status information of the first node includes the value of the running parameter of the first node, the second node obtains the identifier of the first node and the value of the running parameter of the first node. When the value of the running parameter is greater than or equal to an alarm threshold of the running parameter and less than a fault threshold of the running parameter, the second node sends an alarm message, where the alarm message includes the identifier of the first node and the value of the running parameter of the first node. The second node may send the alarm message to a network management system or a controller.

In still another optional implementation, when the status information of the first node includes the value of the running parameter of the first node, the second node obtains the identifier of the first node and the value of the running parameter of the first node. When the value of the running parameter is greater than a fault threshold of the running parameter, the second node determines a type and an attribute of the first node based on the identifier of the first node, and then performs a fault handling operation based on the type and the attribute of the first node and a type and an attribute of the second node. In this scenario, for the fault handling operation performed by the second node, refer to the fault handling operation performed by the second node when the status information of the first node includes the identifier indicating that the first node is locally unreachable.

Further, in step S330, the first access device and the second access device send a keepalive message to each other, so that the first access device determines whether a connection to the second access device is interrupted.

Step S330 may be performed before step S310, may be performed after step S310, or may not be performed.

In step S340, the first access device determines whether a fault that makes the third node remotely unreachable exists. When the fault that makes the third node remotely unreachable does not exist, the first access device may continue to perform step S340 after waiting for a period of time. When the fault that makes the third node remotely unreachable exists, the first access device performs step S350. The third node refers to a local node of the second access device other than the first access device, that is, a node deployed on a host directly connected to the second access device. In this disclosure, that a node is "remotely unreachable" means that an access device cannot access the node by using an access device of the node. For example, if a link between the access device 20a and the access device 20c is faulty, and as a result, the access device 20a cannot send a message to local compute nodes 50d and 50e, storage nodes 40f and 40g, and the control node 60b of the access node 20c, the compute nodes 50d and 50e, the storage nodes 40f and 40g, and the control node 60b are remotely unreachable relative to the access device 20a.

In a first implementation of step S340, the first access device may determine, based on whether the keepalive message sent by the second access device is received in step S330, whether the node connected to the second access device is remotely unreachable. If no keepalive message sent by the second access device is received within specified time or a specified period, the first access device determines that communication with the second access device is interrupted, that is, determines that the third node connected to the second access device is remotely unreachable.

In a second implementation of step S340, the first access device may monitor a routing table. If a route of the second access device that is originally reachable becomes unreachable (for example, routing information of a subnet corresponding to the second access device is deleted or set to invalid), the first access device determines that communication with the second access device is interrupted.

In the foregoing first and second implementations, that the communication between the first access device and the second access device is interrupted means that the third node connected to the second access device is remotely unreachable. In this case, the third node refers to all nodes connected to the second access device. Assume that the first access device is 20a, and the second access device is 20c, that the communication between the first access device and the second access device is interrupted means that the access device 20a cannot communicate with the access device 20c by using the backbone device 30a, and cannot communicate with the access device by using the backbone device 30b. In this case, a node connected to the access device 20a cannot access any node of the access device 20c.

In an implementation, an access mapping table on each access device stores a correspondence between a node and an access device of the node in the entire distributed storage system. Therefore, after communication with the second access device is interrupted, the first access device may determine, based on the access mapping table, the third node that is remotely unreachable.

In a third implementation of step S340, the first access device may monitor a routing table. If a route of the third node that is originally reachable becomes unreachable (for example, a routing entry corresponding to the third node is deleted or set to invalid), the first access device determines that the third node is remotely unreachable. In this case, the third node may be one node, a plurality of nodes, or all nodes corresponding to one subnet.

In step S350, the first access device sends a second notification message to a fourth node, where the second notification message is used to notify the fourth node that communication with the second access device is interrupted or the third node connected to the second access device is remotely unreachable.

In this disclosure, the second notification message is a message sent by the access device when the access device finds that the node is remotely unreachable, and there may be one or more second notification messages. Optionally, the second notification message may include a fault location, fault time, and the like.

When the second notification message is used to notify that communication with the second access device is interrupted, the fault location may be an identifier (for example, an IP address, a MAC address, or a path identifier) of the second access device, a subnet prefix of the second access device, or the like. Correspondingly, the second notification message may include the identifier or the subnet prefix of the second access device, and the second notification message may further include an identifier indicating that communication with the second access device is interrupted.

When the second notification message is used to notify that the third node connected to the second access device is remotely unreachable, the fault location may be identifiers of one or more third nodes, and the identifiers of the one or more third nodes may be information that can uniquely identify the third node, such as an IP address, a MAC address, a device name, or a device identifier. Correspondingly, the second notification message may include the identifier of the third node and an identifier indicating that the third node is remotely unreachable.

When the communication between the first access device and the second access device is interrupted, using the identifier or the subnet prefix of the second access device as the fault location and sending the second notification message through broadcast or multicast can reduce a quantity of second notification messages sent by the first access device, and save network bandwidth. In this case, the fourth node may be all local nodes of the first access device.

The first access device may also generate different second notification messages based on a type and an attribute of each third node, and send the different second notification messages to different fourth nodes. In this case, the fourth node may be a local node of the first access device, or may be a local node of another access device. The fourth node may be one node, or may be a plurality of nodes. The fourth node may include the first node. Optionally, the first access device may find all third nodes based on the stored access mapping table, then determine the type and the attribute of each third node based on the node mapping table, and generate the different second notification messages based on the type and the attribute of each third node.

In an implementation, the access device 20a in FIG. 1 is the first access device, and the access device 20c is the second access device. The access device 20a detects that no keepalive message sent by the access device 20c is received within specified time, determines that communication with the access device 20c is interrupted, and may further determine that local nodes of the access device 20c, that is, the compute nodes 50d and 50e, the storage nodes 40f and 40g, and the control node 60b, are remotely unreachable relative to the access device 20a. The access device 20a may generate a second notification message, where the second notification message includes an identifier (for example, an IP address) or a subnet prefix of the access device 20c and an identifier indicating that the communication between the access device 20a and the access device 20c is interrupted, and send the second notification message to all local nodes, that is, the compute node 50a and the storage nodes 40a-40c through unicast, broadcast, or multicast. The access device 20a may further generate different second notification messages based on information that is about the local nodes of the access device 20c and that is stored in the access device 20 and a subscription table stored in the access device 20a. For example, when the access device 20a determines that the compute nodes 50d and 50e, the storage nodes 40f and 40g, and the control node 60b are remotely unreachable, the access device 20a may send, based on the subscription table, a second notification message indicating that the control node 60b is remotely unreachable to the compute node 50a and the storage node 40b, or may send, based on the subscription table, a second notification message indicating that the compute node 50d is remotely unreachable to the compute node 50a.

In step S355, the fourth node receives the second notification message, and performs a processing operation based on the second notification message.

There may be one or more fourth nodes. When there is a plurality of fourth nodes, after receiving the second notification message, each fourth node performs a processing operation based on the second notification message.

When the second notification message is a broadcast or multicast message, the broadcast or multicast message may include the identifier or the subnet prefix of the second access device, include an identifier of one third node, or include identifiers of a plurality of third nodes. After receiving the second notification message, the fourth node may obtain the identifier or the subnet prefix of the second access device, determine the identifier of the third node based on the identifier or the subnet prefix of the second access device, and perform a corresponding processing operation based on the identifier of the third node. For example, the fourth node records information about an associated node of the fourth node. The associated node may be a node that needs to be accessed by the fourth node. The fourth node compares an identifier of the associated node with the identifier or the subnet prefix of the second access device, uses a matched identifier of the associated node as the identifier of the third node, determines a type and an attribute of the third node based on the identifier of the third node, and performs a fault handling operation based on the type and the attribute of the third node and a type and an attribute of the fourth node. Optionally, the associated node of the fourth node is recorded in an association table of the fourth node, and the association table records the identifier, the type, and the attribute of the associated node of the fourth node. In another implementation, the fourth node may further store the identifier or the subnet prefix of the second access device, and when the fourth node needs to access a new node, compare the stored identifier or subnet prefix of the second access device with an identifier of the new node, to determine whether a fault handling operation needs to be performed on the new node. When the identifier of the new node matches the identifier or the subnet prefix of the second access device, the fourth node determines that the fault handling operation needs to be performed on the new node. Then, the fourth node determines a type and an attribute of the new node based on the identifier of the new node, and performs the fault handling operation based on the type and the attribute of the new node and the type and the attribute of the fourth node. When the second notification message is a unicast message, the second notification message includes an identifier of a third node, and the fourth node performs a fault handling operation based on the identifier of the third node. That is, the fourth node obtains the identifier of the third node from the second notification message, and determines, based on status information of the third node, that the first node is remotely unreachable. The fourth node determines a type and an attribute of the third node based on the identifier of the third node, and the fourth node performs the fault handling operation based on the type and the attribute of the third node and a type and an attribute of the fourth node.

For the fault handling operation performed by the fourth node, refer to the fault handling process of the second node.

In this disclosure, a first phase (including steps S310, S315, S320, and S325) and a second phase (including steps 330, S340, S350, and S355) are two independent processes. Therefore, the second phase may be performed before or after the first phase, or and may be performed simultaneously with the first phase.

The first node, the second node, the third node, and fourth node in this disclosure are merely used to distinguish different functions of the nodes in different scenarios, but are not used to distinguish different nodes. A same node, for example, the compute node 50a, may be used as a locally unreachable first node of the access device 20a at a moment T1 because a fault occurs, or may be used, at a moment T2 after the fault is rectified, as a second node that receives a notification sent by the access device 20a for notifying that the storage node 40a is locally unreachable. Alternatively, the compute node 50a may be used as a remotely unreachable third node by the access device 20b at a moment T3 because communication between the access device 20a and the access device 20b is interrupted, or may be used as a fourth node that receives a notification sent by the access device 20a for notifying that the compute node 50d is remotely unreachable at a moment T4 because communication between the access device 20a and the access device 20c is interrupted. Based on the foregoing reasons, step S325 and step S355 in FIG. 3 of this disclosure may be performed by a same node, or may be performed by different nodes.

In embodiments of this disclosure, an access device in a distributed storage system actively detects whether an exception exists in a network, and sends a notification message to a node (which may be a node that subscribes to a fault notification or all local nodes) after detecting the exception. The node that receives the notification message may perform a corresponding processing operation. In this disclosure, nodes do not need to send a keepalive message to each other, so that a quantity of keepalive messages in the distributed storage system can be reduced, network bandwidth can be saved, and accuracy and reliability of data storage and reading can also be improved.

In the foregoing embodiments provided in this disclosure, the exception handling method provided in embodiments of this disclosure is separately described from perspectives of the node and the access device. It may be understood that, to implement the foregoing functions, the node and the access device include a corresponding hardware structure and/or a software module for implementing each function. A person skilled in the art should be easily aware that functions and steps in the examples described in embodiments disclosed in this disclosure can be implemented in a form of hardware, a combination of hardware and computer software, or the like. Whether a function is performed by hardware or hardware driven by computer software depends on particular applications and design constraints of the technical solutions. A person skilled in the art may use different methods to implement the described functions, but it should not be considered that the implementation goes beyond the scope of this disclosure. The following describes a structure of the node in this disclosure from different perspectives.

To implement the method shown in FIG. 3 of this disclosure, an embodiment of this disclosure provides an access device 500. The access device 500 may be the first access device in FIG. 3. In addition to components shown in FIG. 5, the access device 500 may further include other components to implement more functions.

As shown in FIG. 5, the access device 500 includes a detection unit 5031 and a processing unit 5032. In this embodiment of this disclosure, the detection unit 5031 is configured to perform step S310 and/or S340, and the processing unit 5032 is configured to perform step S320 and/or S340. Further, the processing unit 5032 may further implement step S330. The following describes in detail functions of the detection unit 5031 and the processing unit 5032.

The detection unit 5031 is configured to detect a status of a first node, the access device 500 is an access device of the first node, and the first node is a storage node, a compute node, or a control node.

The processing unit 5032 is configured to send a first notification message to a second node when the status of the first node meets a preset condition, where the second node is a node other than the first node in a distributed storage system, and the first notification message includes an identifier of the first node and status information of the first node.

In an implementation, that the status of the first node meets the preset condition includes that a value of a running parameter of the first node is greater than or equal to a specified threshold, and the status information of the first node includes the value of the running parameter of the first node.

In another implementation, that the status of the first node meets the preset condition includes that the first node is locally unreachable, and the status information of the first node includes an identifier indicating that the first node is locally unreachable.

Optionally, that the first node is locally unreachable includes that the access device 500 does not receive a keepalive message from the first node within specified time, or a port through which the access device 500 is connected to the first node fails.

Optionally, when sending the first notification message to the second node, the processing unit 5032 is configured to send the first notification message to the second node based on a query message sent by the second node, or actively send the first notification message to the second node based on a specified condition.

In an implementation, the distributed storage system further includes a second access device and a third node connected to the second access device. The processing unit 5032 is further configured to send a second notification message to a fourth node when routing information of the third node is deleted or set to invalid, where the fourth node accesses the access device 500, and the second notification message is used to notify the fourth node that the third node is remotely unreachable.

In another implementation, the distributed storage system further includes a second access device, and the processing unit 5032 is further configured to send a second notification message to a fourth node after communication between the access device 500 and the second access device is interrupted, where the fourth node accesses the access device 500, and the second notification message is used to notify the fourth node that a third node connected to the second access device is remotely unreachable.

Further, the access device 500 may further include a storage unit 5033 configured to store data required for implementing the method shown in FIG. 3. The data 5033 may include, for example, a subscription table and a routing table.

The detection unit 5031 and the processing unit 5032 may be implemented by hardware, or may be implemented by software. When the detection unit 5031 and the processing unit 5032 are implemented by software, as shown in FIG. 5, the access device 500 may further include a processor 501, a communications interface 502, and a memory 503. The processor 501, the communications interface 502, and the memory 503 are connected through a bus system 504. The memory 503 is configured to store program code, and the program code includes instructions that can implement functions of the detection unit 5031 and the processing unit 5032. The processor 501 may invoke the program code in the memory 503, to implement the functions of the detection unit 5031 and the processing unit 5032. Further, the access device 500 may further include a programming interface 505 configured to write the program code into the memory 503.

In this embodiment of this disclosure, the processor 501 may be a CPU, or may be another general-purpose processor, a digital signal processor (DSP), an application-specific integrated circuit (ASIC), a field-programmable gate array (FPGA), another programmable logic device, a discrete gate or transistor logic device, a discrete hardware component, or the like. The general-purpose processor may be a microprocessor or any conventional processor. The processor 501 may include one or more processing cores.

The communications interface 502 is configured to communicate with an external device, for example, implement a receiving and/or sending function in cooperation with the program code in the memory 503. The communications interface 502 in FIG. 5 is merely an example. In practice, the access device 500 may include a plurality of communications interfaces, to connect to a plurality of different external devices and communicate with these external devices.

The memory 503 may include a read-only memory (ROM) or a random-access memory (RAM). Any other proper type of storage device may also be used as the memory 503. The memory 503 may include one or more storage devices. The memory 503 may further store an operating system 5034, where the operating system is configured to support running of the access device 500.

The bus system 504 may further include a power bus, a control bus, a status signal bus, and the like, in addition to a data bus. However, for clear description, various buses in the figure are marked as the bus system 504.

To implement the method shown in FIG. 3 of this disclosure, an embodiment of this disclosure further provides a terminal device 600. The terminal device 600 may be a node (in this case, the node is a physical device), or may be a host on which the node is located (in this case, the node is a virtual device running on a physical device). The terminal device 600 may have functions of the second node and/or the fourth node in FIG. 3. In addition to components shown in FIG. 6, the terminal device 600 may further include other components to implement more functions.

Figure 6:
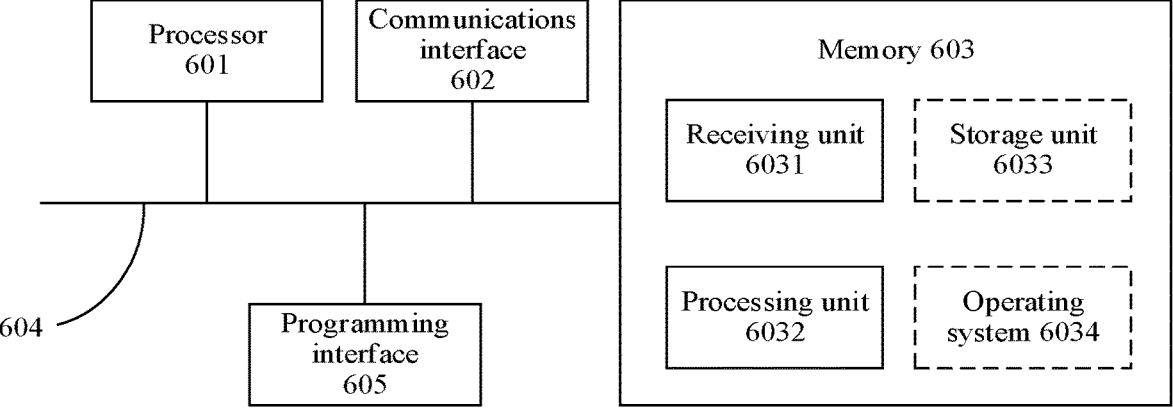
FIG. 6 is a schematic diagram of a structure of a terminal device 600 according to an embodiment of this disclosure.

As shown in FIG. 6, the terminal device 600 includes a receiving unit 6031 and a processing unit 6032. In this embodiment of this disclosure, the receiving unit 6031 is configured to perform step S320 and/or S350, and the processing unit 6032 is configured to perform step S325 and/or S355. Further, the processing unit 6032 may further implement step S315. The following describes in detail functions of the receiving unit 6031 and the processing unit 6032.

The receiving unit 6031 is configured to receive a first notification message from a first access device, where the first notification message is generated when the first access device determines that a status of the first node meets a preset condition, and the first notification message includes an identifier of the first node and status information of the first node.

The processing unit 6032 is configured to perform a processing operation based on the first notification message.

In an implementation, the status information of the first node includes an identifier indicating that the first node is locally unreachable, and the processing unit 6032 is configured to obtain the identifier of the first node, determine, based on the status information of the first node, that the first node is locally unreachable, determine a type and an attribute of the first node based on the identifier of the first node, and perform a fault handling operation based on the type and the attribute of the first node and a type and an attribute of the second node.

In another implementation, the status information of the first node includes a value of a running parameter of the first node, and the processing unit 6032 is configured to obtain the identifier of the first node and the value of the running parameter of the first node, send an alarm message when the value of the running parameter is greater than or equal to an alarm threshold of the running parameter and less than a fault threshold of the running parameter, where the alarm message includes the identifier of the first node and the value of the running parameter of the first node, or determine a type and an attribute of the first node based on the identifier of the first node when the value of the running parameter is greater than a fault threshold of the running parameter, and perform a fault handling operation based on the type and the attribute of the first node and a type and an attribute of the second node.

In an implementation, the receiving unit 6031 is further configured to receive a second notification message, where the second notification message is used to notify the second node that communication with a second access device in a distributed storage system is interrupted or a third node connected to the second access device is remotely unreachable, and the processing unit 6032 is further configured to perform a processing operation based on the second notification message.

Optionally, the second notification message includes an identifier of the third node and an identifier indicating that the third node is remotely unreachable, and the processing unit 6032 is configured to obtain the identifier of the third node from the second notification message, determine, based on status information of the third node, that the first node is remotely unreachable, determine a type and an attribute of the third node based on the identifier of the third node, and perform a fault handling operation based on the type and the attribute of the third node and the type and the attribute of the second node.

Optionally, the second notification message includes an identifier or a subnet prefix of the second access device, and the processing unit 6032 is configured to obtain the identifier or the subnet prefix of the second access device from the second notification message, determine an identifier that is of the third node and that matches the identifier or the subnet prefix of the second access device, determine a type and an attribute of the third node based on the identifier of the third node, and perform a fault handling operation based on the type and the attribute of the third node and the type and the attribute of the second node.

The second notification message includes an identifier or a subnet prefix of the second access device, and the processing unit 6032 is configured to obtain the identifier or the subnet prefix of the second access device from the second notification message, send the identifier or the subnet prefix of the second access device to a storage unit, so that the storage unit stores the identifier or the subnet prefix of the second access device, compare an identifier of a new node with the identifier or the subnet prefix of the second access device before the second access device needs to access the new node, determine, by the second node, a type and an attribute of the new node based on the identifier of the new node when the identifier of the new node matches the identifier or the subnet prefix of the second access device, and perform a fault handling operation based on the type and the attribute of the new node and the type and the attribute of the second node.

Further, the terminal device 600 may further include a storage unit 6033 configured to store data required for implementing the method shown in FIG. 3. The data may include, for example, an association table, the identifier or the subnet prefix of the second access device, and a node mapping table.

The receiving unit 6031 and the processing unit 6032 may be implemented by hardware, or may be implemented by software. When the receiving unit 6031 and the processing unit 6032 are implemented by software, as shown in FIG. 6, the terminal device 600 may further include a processor 601, a communications interface 602, and a memory 603. The processor 601, the communications interface 602, and the memory 603 are connected through a bus system 604. The memory 603 is configured to store program code, and the program code includes instructions that can implement functions of the receiving unit 6031 and the processing unit 6032. The processor 601 may invoke the program code in the memory 603, to implement the functions of the receiving unit 6031 and the processing unit 6032. Further, the terminal device 600 may further include a programming interface 605 configured to write the program code into the memory 603.

In this embodiment of this disclosure, the processor 601 may be a CPU, or may be another general-purpose processor, a DSP, an ASIC, an FPGA, or another programmable logic device, a discrete gate or transistor logic device, a discrete hardware component, or the like. The general-purpose processor may be a microprocessor or any conventional processor. The processor 601 may include one or more processing cores.

The communications interface 602 is configured to communicate with an external device, for example, implement a receiving and/or sending function in cooperation with the program code in the memory 603. The communications interface 602 in FIG. 6 is merely an example. In practice, the terminal device 600 may include a plurality of communications interfaces, to connect to a plurality of different external devices and communicate with these external devices.

The memory 603 may include a ROM or a RAM. Any other proper type of storage device may also be used as the memory 603. The memory 603 may include one or more storage devices. The memory 603 may further store an operating system 6034, where the operating system 6034 is configured to support running of the terminal device 600.

The bus system 604 may further include a power bus, a control bus, a status signal bus, and the like, in addition to a data bus. However, for clear description, various types of buses in the figure are marked as the bus system 604.

The components of the access device 500 or the terminal device 600 provided in this embodiment of this disclosure are merely examples. A person skilled in the art may add or remove a component based on a requirement, or may split functions of one component so that the functions are implemented by using a plurality of components. For implementations of the functions of the access device 500 or the terminal device 600 in this disclosure, refer to the descriptions of the steps in FIG. 3.

Based on the foregoing descriptions of the embodiments, a person skilled in the art may clearly understand that the access device 500 or the terminal device 600 in this disclosure may be implemented by hardware, or may be implemented by software in addition to a necessary universal hardware platform. Based on such an understanding, the technical solutions of this disclosure may be embodied in a form of a hardware product or a software product. The hardware product may be a dedicated chip or a processor. The software product may be stored in a non-volatile storage medium (which may be a compact disc (CD) ROM (CD-ROM), a Universal Serial Bus (USB) flash drive, a removable hard disk, or the like), and the software product includes several instructions. When the software product is executed, a computer device is enabled to perform the methods described in embodiments of this disclosure.

The foregoing descriptions are merely preferred implementations of this disclosure. It should be noted that a person of ordinary skill in the art may make several improvements or polishing without departing from the principle of this disclosure and the improvements or polishing shall fall within the protection scope of this disclosure.

What is claimed is:

1. An exception handling method implemented by a first access device in a distributed storage system, wherein the exception handling method comprises:

detecting a status of a first node of the distributed storage system, wherein the first access device is coupled to the first node, and wherein the first node is a first storage node or a first compute node;

sending, to a second node of the distributed storage system, a first notification message when the status meets a preset condition, wherein the first notification message comprises a first identifier and status information of the first node; wherein the second node is a second storage node or a second compute node; and sending, to a fourth node of the distributed storage system, a second notification message after communication between the first access device and a second access device of the distributed storage system is interrupted, wherein the fourth node is coupled to the first access device, wherein the fourth node is a third storage node or a third compute node, and wherein the second notification message notifies the fourth node that communication of the second access device is interrupted or a third node of the distributed storage system coupled to the second access device is remotely unreachable.

2. The exception handling method of claim 1, wherein the preset condition is that a value of a running parameter of the first node is greater than or equal to a threshold and the status information comprises the value, or wherein the preset condition is that the first node is locally unreachable and the status information comprises a second identifier indicating that the first node is locally unreachable.

3. The exception handling method of claim 2, wherein the first node is locally unreachable when:

the first access device does not receive a keepalive message from the first node within a predetermined time; or a port through which the first access device is coupled to the first node has failed.

4. The exception handling method of claim 1, wherein sending the first notification message comprises:

sending the first notification message to the second node based on a query message from the second node; or sending the first notification message to the second node based on a specified condition.

5. The exception handling method of claim 1, further comprising sending, to a fourth node of the distributed storage system, a second notification message when routing information of a third node of the distributed storage system is deleted or set to invalid, and wherein the second notification message notifies the fourth node that the third node is remotely unreachable.

6. An exception handling method implemented by a second node in a distributed storage system, wherein the exception handling method comprises:

receiving, from a first access device of the distributed storage system, a first notification message when a status of a first node of the distributed storage system meets a preset condition, wherein the first notification message comprises a first identifier of the first node and first status information of the first node, wherein the first node is coupled to the first access device, wherein the first node is a first storage node or a first compute node;

performing a first processing operation based on the first notification message;

receiving a second notification message notifying the second node that communication with a second access device of the distributed storage system is interrupted or a third node of the distributed storage system coupled to the second access device is remotely unreachable, wherein the second node is a second storage node or a second compute node; and performing a second processing operation based on the second notification message.

7. The exception handling method of claim 6, wherein the first status information comprises a second identifier indicating that the first node is locally unreachable, and wherein the first processing operation comprises:

obtaining the first identifier from the first notification message;

determining, based on the first status information, that the first node is locally unreachable;

determining a first type and a first attribute of the first node based on the first identifier; and performing, based on the first type, the first attribute, and a second type and a second attribute of the second node, a fault handling operation.

8. The exception handling method of claim 6, wherein the first processing operation comprises:

obtaining the first identifier and a value of a running parameter of the first node from the first notification message; and sending an alarm message when the value is greater than or equal to an alarm threshold of the running parameter and less than a fault threshold of the running parameter, wherein the alarm message comprises the first identifier and the value.

9. The exception handling method of claim 6, wherein the first processing operation comprises:

obtaining the first identifier and a value of a running parameter of the first node from the first notification message;

determining a first type and a first attribute of the first node based on the first identifier when the value is greater than a fault threshold of the running parameter; and performing a fault handling operation based on the first type, the first attribute, and a second type and a second attribute of the second node.

10. The exception handling method of claim 6, wherein the second notification message comprises a second identifier of the third node and a third identifier indicating that the third node is remotely unreachable, and wherein performing the second processing operation comprises:

obtaining the second identifier from the second notification message;

determining, based on second status information of the third node, that the first node is remotely unreachable;

determining a first type and a first attribute of the third node based on the second identifier; and performing a fault handling operation based on the first type, the first attribute, and a second type and a second attribute of the second node.

11. The exception handling method of claim 6, wherein the second processing operation comprises:

obtaining a second identifier or a subnet prefix of the second access device from the second notification message;

determining a third identifier that is of the third node and that matches the second identifier or the subnet prefix;

determining a first type of the third node and a first attribute of the third node based on the third identifier; and performing a fault handling operation based on the first type and the first attribute and a second type of the second node and a second attribute of the second node.

12. The exception handling method of claim 6, wherein the second processing operation comprises:

obtaining a second identifier or a subnet prefix of the second access device from the second notification message;

storing the second identifier or the subnet prefix;

comparing a third identifier of a new node with the second identifier or the subnet prefix before the second node accesses the new node;

determining a first type and a first attribute of the new node based on the third identifier when the third identifier matches the second identifier or the subnet prefix; and performing a fault handling operation based on the first type, the first attribute, and a second type and a second attribute of the second node.

13. A first access device in a distributed storage system comprising:

a memory configured to store instructions; and one or more processors coupled to the memory and configured to execute the instructions to cause the first access device to:

detect a status of a first node of the distributed storage system, wherein the first access device is coupled to the first node, and wherein the first node is a first storage node or a first compute node;

send a first notification message to a second node of the distributed storage system when the status meets a preset condition, wherein the first notification message comprises a first identifier and status information of the first node; wherein the second node is a second storage node or a second compute node; and send a second notification message to a fourth node of the distributed storage system after communication between the first access device and a second access device of the distributed storage system is interrupted, wherein the fourth node is coupled to the first access device, wherein the fourth node is a third storage node or a third compute node, and wherein the second notification message notifies the fourth node that communication of the second access device is interrupted or a third node of the distributed storage system coupled to the second access device is remotely unreachable.

14. The first access device of claim 13, wherein the preset condition is that a value of a running parameter of the first node is greater than or equal to a threshold and the status information comprises the value; or wherein the preset condition is that the first node is locally unreachable and the status information comprises a second identifier indicating that the first node is locally unreachable.

15. The first access device of claim 14, wherein the first node is locally unreachable when:

the first access device does not receive a keepalive message from the first node within a predetermined time; or a port through which the first access device is coupled to the first node has failed.

16. The first access device of claim 13, wherein the instructions, when executed by the one or more processors, further cause the first access device to:

send the first notification message to the second node based on a query message from the second node; or send the first notification message to the second node based on a specified condition.

17. The first access device of claim 13, wherein the instructions, when executed by the one or more processors, further cause the first access device to send a second notification message to a fourth node of the distributed storage system when routing information of a third node of the distributed storage system that is coupled to a second access device of the distributed storage system is deleted or set to invalid, and wherein the second notification message notifies the fourth node that the third node is remotely unreachable.

18. A second node in a distributed storage system, the second node comprising:

a memory configured to store instructions; and one or more processors coupled to the memory and configured to execute the instructions to cause the second node to:

receive, from a first access device of the distributed storage system, a first notification message when a status of a first node of the distributed storage system meets a preset condition, wherein the first notification message comprises a first identifier of the first node and first status information of the first node, wherein the first node is coupled to the first access device, wherein the first node is a storage node or a compute node;

perform a first processing operation based on the first notification message;

receive a second notification message notifying the second node that communication with a second access device of the distributed storage system is interrupted or a third node of the distributed storage system coupled to the second access device is remotely unreachable; wherein the second node is a second storage node or a second compute node; and perform a second processing operation based on the second notification message.

19. The second node of claim 18, wherein the instructions, when executed by the one or more processors, further cause the second node to:

obtain the first identifier and a value of a running parameter of the first node from the first notification message; and send an alarm message when the value is greater than or equal to an alarm threshold of the running parameter and less than a fault threshold of the running parameter, wherein the alarm message comprises the first identifier and the value.

20. The second node of claim 18, wherein the first status information a second identifier indicating that the first node is locally unreachable, and wherein the instructions, when executed by the one or more processors, further cause the second node to:

obtain the first identifier from the first notification message;

determine, based on the first status information, that the first node is locally unreachable;

determine a first type and a first attribute of the first node based on the first identifier; and perform, based on the first type, the first attribute, and a second type and a second attribute of the second node, a fault handling operation.

21. The second node of claim 18, wherein the instructions, when executed by the one or more processors, further cause the second node to:

obtain the first identifier and a value of a running parameter of the first node from the first notification message;

determine a first type and a first attribute of the first node based on the first identifier when the value is greater than a fault threshold of the running parameter; and perform a fault handling operation based on the first type, the first attribute, and a second type and a second attribute of the second node.

22. The second node of claim 18, wherein the second notification message comprises a second identifier of the third node and a third identifier indicating that the third node is remotely unreachable, and wherein the instructions, when executed by the one or more processors, further cause the second node to:

obtain the second identifier from the second notification message;

determine, based on second status information of the third node, that the first node is remotely unreachable;

determine a first type and a first attribute of the third node based on the second identifier; and perform a fault handling operation based on the first type, the first attribute, and a second type and a second attribute of the second node.

23. The second node of claim 18, wherein the instructions, when executed by the one or more processors, further cause the second node to:

obtain a second identifier or a subnet prefix of the second node from the second notification message;

determine a third identifier that is of the third node and that matches the second identifier or the subnet prefix;

determine a first type of the third node and a first attribute of the third node based on the third identifier; and perform a fault handling operation based on the first type and the first attribute and a second type of the second node and a second attribute of the second node.

24. The second node of claim 18, wherein the instructions, when executed by the one or more processors, further cause the second node to:

obtain a second identifier or a subnet prefix of the second node from the second notification message;

store the second identifier or the subnet prefix;

compare a third identifier of a new node with the second identifier or the subnet prefix before the second node accesses the new node;

determine a first type and a first attribute of the new node based on the third identifier when the third identifier matches the second identifier or the subnet prefix; and perform a fault handling operation based on the first type, the first attribute, and a second type and a second attribute of the second node.

* * * * *